United States Patent
Khorshidian et al.

(10) Patent No.: US 12,181,396 B2
(45) Date of Patent: Dec. 31, 2024

(54) RHEOLOGY DEVICE AND METHOD

(71) Applicant: Opla Energy Ltd., Calgary (CA)

(72) Inventors: Hossein Khorshidian, Calgary (CA); Elvin Mammadov, Calgary (CA); Saied Afshari, Calgary (CA); Ahmad Alizadeh, Calgary (CA)

(73) Assignee: Opla Energy Ltd., Calgary (CA)

( * ) Notice: Subject to any disclaimer, the term of this patent is extended or adjusted under 35 U.S.C. 154(b) by 646 days.

(21) Appl. No.: 17/365,381

(22) Filed: Jul. 1, 2021

(65) Prior Publication Data

US 2022/0003649 A1    Jan. 6, 2022

Related U.S. Application Data

(60) Provisional application No. 63/047,634, filed on Jul. 2, 2020.

(51) Int. Cl.
   *G06F 11/30* (2006.01)
   *G01N 11/08* (2006.01)

(52) U.S. Cl.
   CPC .................................. *G01N 11/08* (2013.01)

(58) Field of Classification Search
   CPC ..................................................... G01N 11/08
   See application file for complete search history.

(56) References Cited

U.S. PATENT DOCUMENTS

| | | |
|---|---|---|
| 5,172,585 A | 12/1992 | Gleissle |
| 9,909,413 B2 | 3/2018 | Van Oort et al. |
| 10,185,306 B2 | 1/2019 | Ashok et al. |
| 10,385,636 B2 | 8/2019 | Midlang et al. |
| 10,859,481 B2 | 12/2020 | Van Oort et al. |
| 2018/0291727 A1* | 10/2018 | van Oort ................. E21B 47/10 |
| 2019/0345784 A1 | 11/2019 | Midlang et al. |

FOREIGN PATENT DOCUMENTS

| | | |
|---|---|---|
| WO | 2016040272 A1 | 3/2016 |
| WO | 2016040310 A1 | 3/2016 |

OTHER PUBLICATIONS

Skogestad, J. et a; "Pilot test for automated mud management leverages real-time monitory, hydraulic modeling"; Drilling rigs, Equipment and Automation; Drilling Contractor; Sep./Oct. 2019.

* cited by examiner

*Primary Examiner* — Phuong Huynh
(74) *Attorney, Agent, or Firm* — Blake, Cassels & Graydon LLP; Laurie Wright; Christopher N. Hunter (57) ABSTRACT

A rheology device comprises an elongated body having a flow path defined therein, first and second pressure lines in communication with the first and second ends of the flow path, respectively, and a differential pressure sensor for measuring a difference in pressure between the first and second pressure lines. In embodiments, the pressure lines are filled with a spacer fluid different from the fluid in the flow path. Based on at least three measurements of difference in pressure and corresponding flow rates, a yield point, a consistency factor, and a power factor can be calculated, and a rheology model of the fluid can be generated. Related methods are described which allow fluid rheology models to be determined and updated frequently. The device and methods herein may be useful in oil and gas operations, for example for rheology and hydraulic modeling in drilling operations.

21 Claims, 8 Drawing Sheets

RHEOLOGY DEVICE AND METHOD

CROSS-REFERENCE TO RELATED APPLICATIONS

This application claims the benefit of U.S. Provisional Application No. 63/047,634, filed Jul. 2, 2020, the content of which is hereby incorporated by reference in its entirety.

FIELD

The invention relates to a rheology device and methods for use in industrial applications, and more particularly to a device and related methods that are configured for determining fluid rheology in real-time for various industrial applications, including oil and gas operations.

BACKGROUND

During drilling operations, a drilling fluid, which may also be referred to as drilling mud, is circulated through the wellbore to cool the drill bit, to convey rock cuttings to the surface, or to support the wellbore against collapse of the wellbore and against intrusion of fluids from the formation, among other purposes. Drilling fluids are formulated to have certain fluid characteristics, such as density and rheology, for example, that allow the drilling fluid to perform these functions. However, under certain downhole conditions, such as excessive temperature, for example, some of the properties of the drilling fluid may be altered. These changes in properties of the drilling fluid can lead to problems such as solids settling, stuck pipes, and excessive pump pressure.

One of the most important tasks during any drilling operation is to measure rheological properties of the drilling fluid to allow for optimum operation and wellbore hydraulics management. The rheology of the drilling fluid includes viscosity, static shear force, dynamic shear force, and shear dilution characteristics. These properties are related to the rock carrying performance of the drilling fluid, the cleanliness of the wellbore, the solids suspension in the drilling fluid, the stability of the well wall, etc. The rheology of the drilling fluid can be used to simulate the characteristics of drilling fluid under dynamic conditions to determine some of the major drilling parameters, such as equivalent circulating density, pressure drops in the drilling system, and hole cleaning efficiency. Therefore, measuring the rheology of the drilling fluid is important in optimizing drilling hydraulic parameters for safe and efficient drilling.

Conventionally, using small mud samples from the mud tank, drilling fluid rheology measurement is routinely carried out, but only a few times a day, by a mud engineer either at the rig site or in a laboratory via test protocols and manual instruments that quantify the relationship between the fluid's shear stress and shear rate, as standardized by the American Petroleum Institute (API). Usually, measurements are conducted at atmospheric pressure and standardized temperature and are therefore generally not representative of actual downhole pressure and temperature conditions. High Pressure High Temperature (HPHT) viscometers can be used at the drilling fluid design stage to determine its rheological properties under downhole conditions. However, these properties are subject to change during drilling operations due to variation in mud maintenance and the introduction of drilling solids and contaminants. Further, conventional drilling fluid rheology measurement equipment, such as a Fann viscometer or a HPHT viscometer, is complex to operate so highly skilled technicians are required, and is highly impractical to install at the rig sited due to its cost, maintenance, calibration difficulties. Based on the rheology measurements, which are only obtained a few times day, the drilling fluid may be adjusted by adding ingredients, but only infrequently.

Accordingly, the conventional rheology measurement process is error-prone, inefficient, and thus not suitable for optimizing and automating drilling mud management. Therefore, there is a need for technology that allows more efficient and frequent determination of drilling fluid rheology.

SUMMARY

According to a broad aspect of the present disclosure, there is provided a rheology device for connection to a fluid flow line having a fluid flowing therethrough, the rheology device comprising: an elongated body having a first end, a second end, and a fluid flow path defined in the elongated body, the fluid flow path extending between the first and second ends, the first and second ends configured for connection to the fluid flow line to allow fluid communication between the fluid flow line and the fluid flow path; a differential pressure sensor; a first pressure line having a first end, a second end, and an inner fluid passageway extending between the first and second ends, the first end coupled to the elongated body and in communication with the fluid flow path at or near the first end of the elongated body, and the second end coupled to and in communication with the differential pressure sensor; and a second pressure line having a first end, a second end, and an inner fluid passageway extending between the first and second ends, the first end coupled to the elongated body and in communication with the fluid flow path at or near the second end of the elongated body, and the second end coupled to and in communication with the differential pressure sensor, the differential pressure sensor for measuring at least three differences in pressure between the first and second pressure lines, each of the at least three differences in pressure corresponding to a different flow rate of the fluid, and the at least three differences in pressure and the corresponding different flow rates are used to determine a rheology model of the fluid.

According to another broad aspect of the present disclosure, there is provided a method for determining a rheology model for a fluid flowing in a fluid flow line, the method comprising: a) measuring a flow rate of the fluid in the fluid flow line; b) determining a corresponding difference in pressure of the fluid between an upstream location and a downstream location of a fluid flow path, the fluid flow path being in fluid communication with the fluid flow line such that at least some of the fluid flows through the fluid flow path from the upstream location to the downstream location; c) changing the flow rate of the fluid; d) repeating steps a) to c) at least three times to provide at least three data pairs, each data pair having a respective flow rate and a respective difference in pressure; e) calculating, based on the at least three data pairs, a yield point, a consistency factor, and a power factor; and f) determining, based on the yield point, the consistency factor, and the power factor, a rheology model of the fluid.

BRIEF DESCRIPTION OF THE DRAWINGS

The invention will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

FIGS. 3A to 3C may be collectively referred to herein as FIG. 3.

FIGS. 5A and 5B may be collectively referred to herein as FIG. 5.

DETAILED DESCRIPTION

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In general, the present disclosure provides a device and methods for determining fluid rheology in real-time, which may be useful in many industrial applications, including for example wellbore drilling operations. In drilling operations, the ability to determine drilling fluid rheology in real-time may allow more accurate hydraulic calculations for optimizing drilling hydraulics. In managed pressure drilling (MPD) operations, real-time drilling fluid rheology calculations may allow more efficient dynamic surface back pressure control and application.

Under static conditions (i.e., when there is no drilling fluid circulation in the wellbore), the pressure profile along the wellbore is the function of the pressure at the surface and the hydrostatic pressure exerted by the effect of gravity of drilling fluid density. Under dynamic conditions (i.e., when there is drilling fluid circulation in the wellbore), the wellbore pressure profile, in addition to the drilling fluid density, is affected by the drilling fluid rheology due to frictional pressure drop associated to the flow of fluids in the wellbore.

A fluid rheology model can be generated based on the drilling fluid rheology calculations. The fluid rheology model is important in drilling operations because the model is used to determine frictional pressure drops in surface facilities, drill pipe, heavy weight drill pipe, drill collars, bottomhole assemblies (BHA), and bit nozzles, and frictional pressure drops in the return of the drilling fluid in the wellbore annulus, i.e., the annular area between the inner surface of the wellbore (whether cased or uncased) and the aforementioned drilling equipment. Based on the frictional pressure drops at different flow rates, the bottomhole pressure (BHP) can be calculated at different flow rates. Further, the pump rate of the drilling fluid can be adjusted to minimize the frictional pressure losses and maximize the hydraulic horsepower or jet impact force delivered to the drill bit. Still further, the surge and swab pressures associated with the axial movement of the drill string in the wellbore can be calculated to avoid applying too much pressure (which may cause the well to frac) or drawing too much pressure (which may cause a kick).

Since the drilling fluid has a non-linear viscosity, the rheology model of the drilling fluid needs to be determined to calculate the abovementioned frictional pressure drops with respect to the geometry of the flow area, boundary conditions (e.g. effect of surface roughness, yield point of the drilling fluid, etc.), as well as the relationship between the shear rate and shear stress of the drilling fluid.

Figure 1:
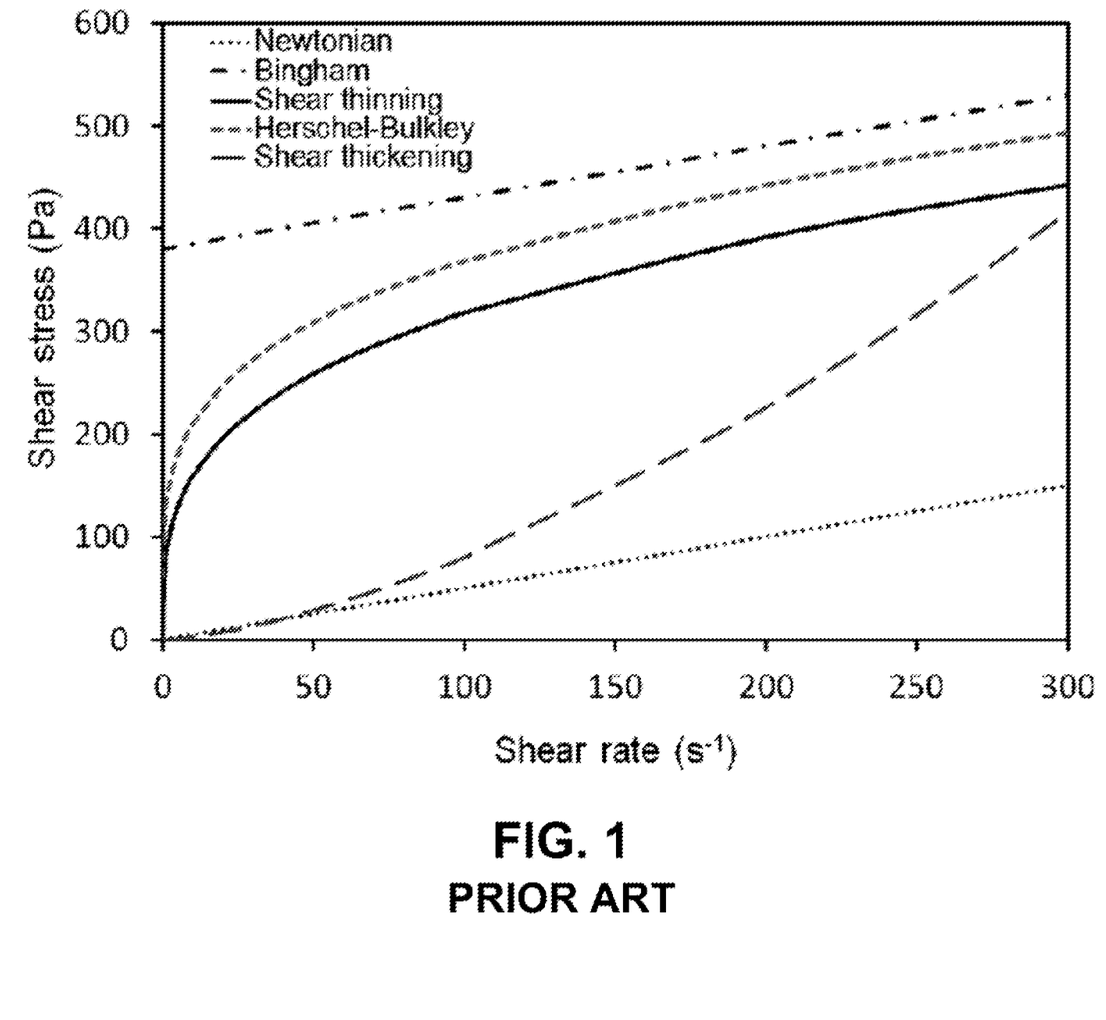
FIG. 1 is a graph illustrating common fluid models for shear stress versus shear rate.
Figure 2:
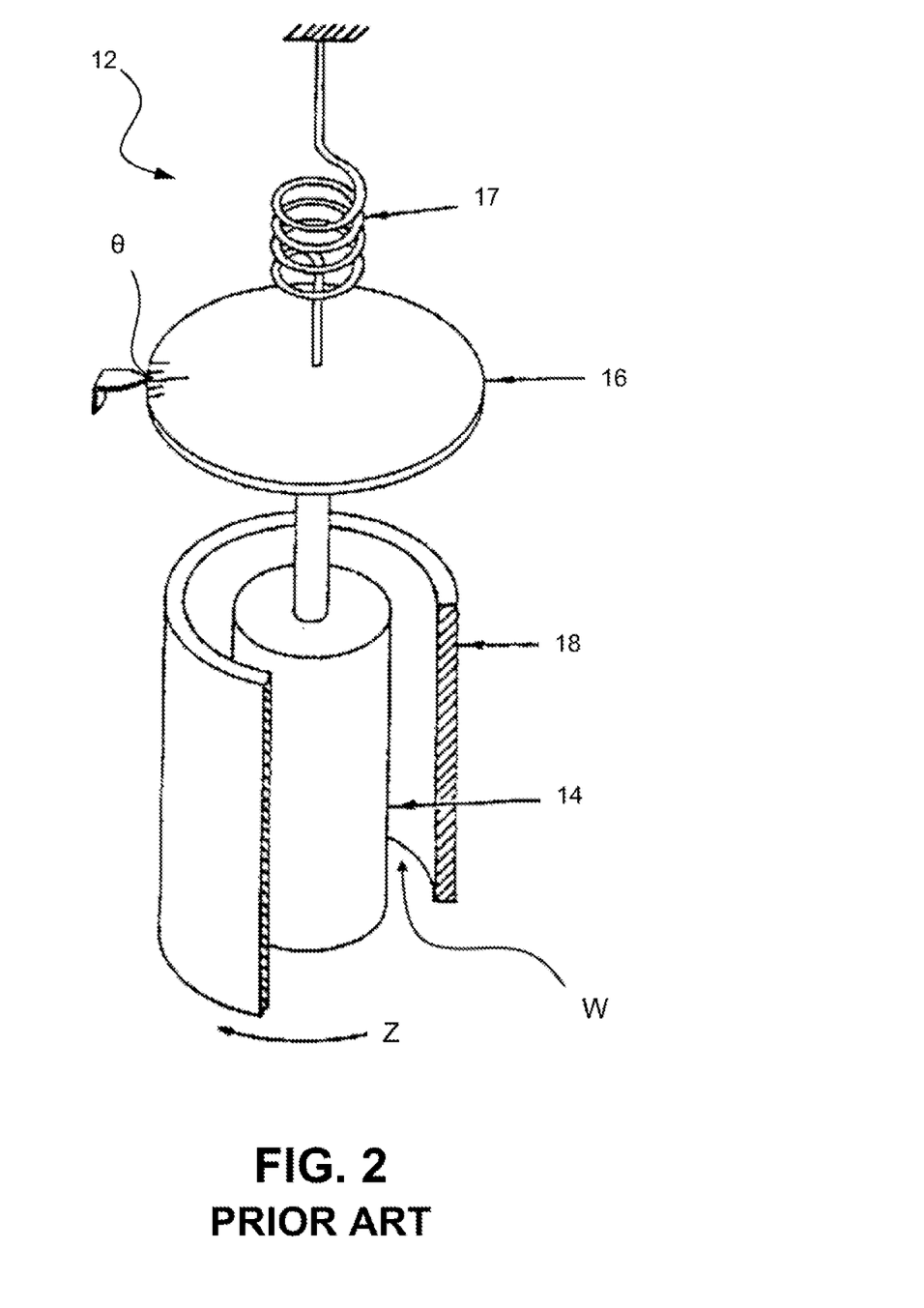
FIG. 2 is a perspective view of a prior art rotary viscometer.

FIG. 1 shows various fluid models that have been developed with different shear stress and shear rate relationships. For example, the shear-thinning model (also known as the power-law model), the Herschel-Bulkley model, the Casson model, and the Robertson-Stiff model are commonly used in the field of drilling engineering. Conventionally, the parameters of these rheology models are determined based on a sample of the drilling fluid (which is periodically collected from the mud tank) using a rotary viscometer that measures the shear stress applied to a bob via rotation of a rotor at certain rotary speeds. A prior art Fann 35 rotary viscometer 12 is shown in FIG. 2. The Fann 35 rotary viscometer 12 comprises a bob 14 rotationally fixedly attached to a dial 16 and a spring 17, and a rotor 18 radially spaced about the circumference of the bob 14 to define an annulus W therebetween. The rotor 18 is rotatable in the direction Z about a longitudinal axis of the bob 14. In operation, the sample of the drilling fluid is placed in the annulus W between the rotor 18 and the bob 14.

In one example, the parameters of the Bingham Plastic model can be obtained using the Fann 35 rotary viscometer 12 by:

$$PV = \theta_{600} - \theta_{300} \qquad (1)$$

$$YP = \theta_{300} - PV \qquad (2)$$

where PV is plastic viscosity, $\theta_{600}$ is the dial reading $\theta$ of the rotary viscometer 12 when the rotor 18 of the rotary viscometer is at a rotary speed of 600 rpm, $\theta_{300}$ is the dial reading $\theta$ of the rotary viscometer when the rotor of the rotary viscometer is at a rotary speed of 300 rpm, and YP is yield point.

In another example, the Herschel-Bulkley model is defined as:

$$\tau = YP + KY^n \qquad (3)$$

where $\tau$ is shear stress, Y is shear rate, K is a consistency factor, n is a power factor, which can be determined by:

$$YP = \theta_3 (\text{lb}/100 \text{ ft}^2) \qquad (4)$$

$$n = (3.32)\log [(\theta_{600} - YP) \div (\theta_{300} - YP)] \qquad (5)$$

$$K = \theta_{300} \div 511^n \qquad (6)$$

where $\theta_3$ is the dial reading $\theta$ of the rotary viscometer 12 when the rotor 18 of the rotary viscometer is at a rotary speed of 3 rpm.

The rheology models obtained using the rotary viscometer 12 have many limitations. For example, a rheology model cannot be accurately calculated using the rotary viscometer for fluids that contain solids, such as rock cuttings. Further, the rheology model calculated using the rotary viscometer may not account for temperature changes of the drilling fluid which occur as drilling depth increases. Still further, there is an error associated with all fluid rheology models and such error may lead to inaccurate frictional pressure drop calculations. Additionally, since drilling fluid samples are taken only a few times a day, the rheology model of the drilling fluid cannot be updated continuously for the drilling operation.

Figure 3A:
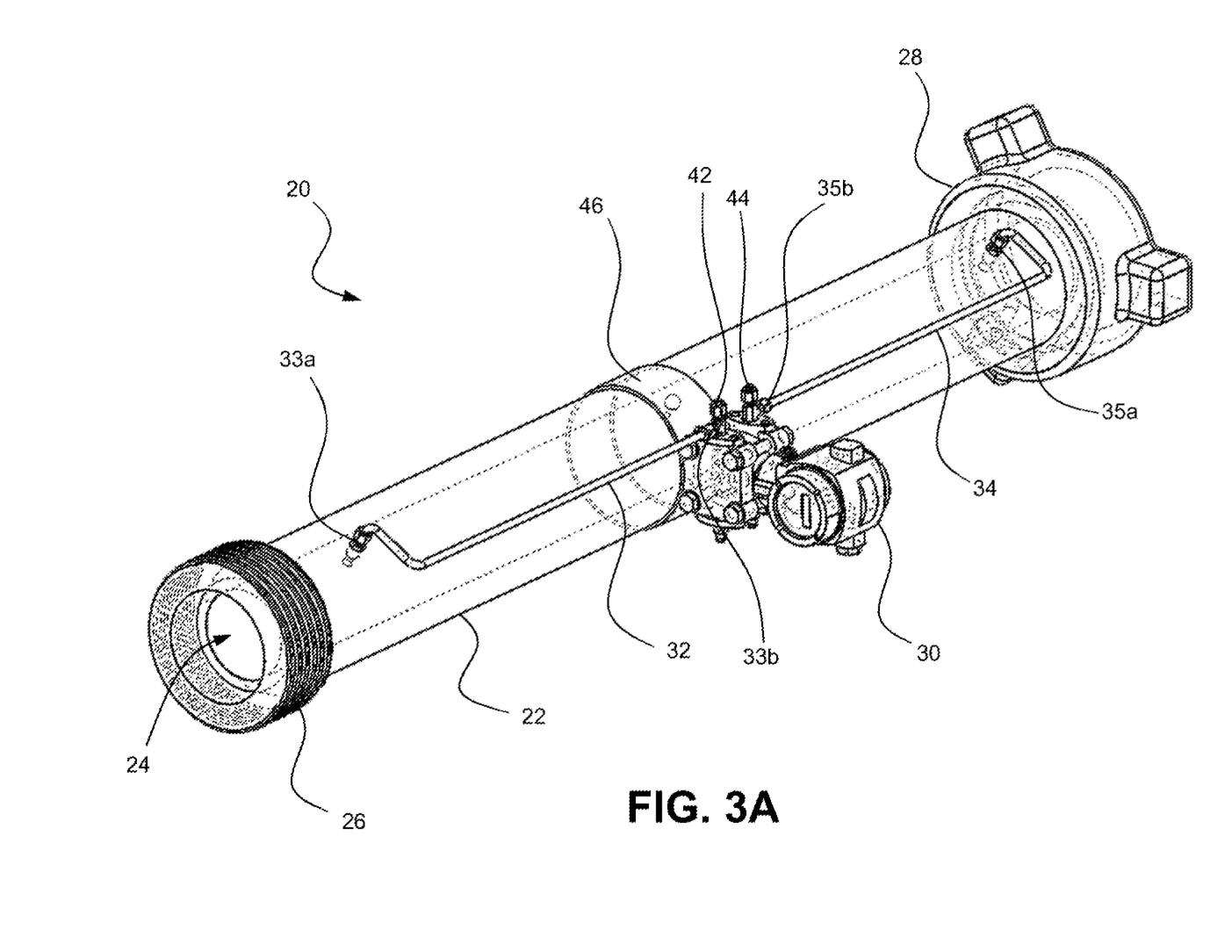
FIG. 3A is a semi-transparent perspective view of a rheology device, according to one embodiment.
Figure 3B:
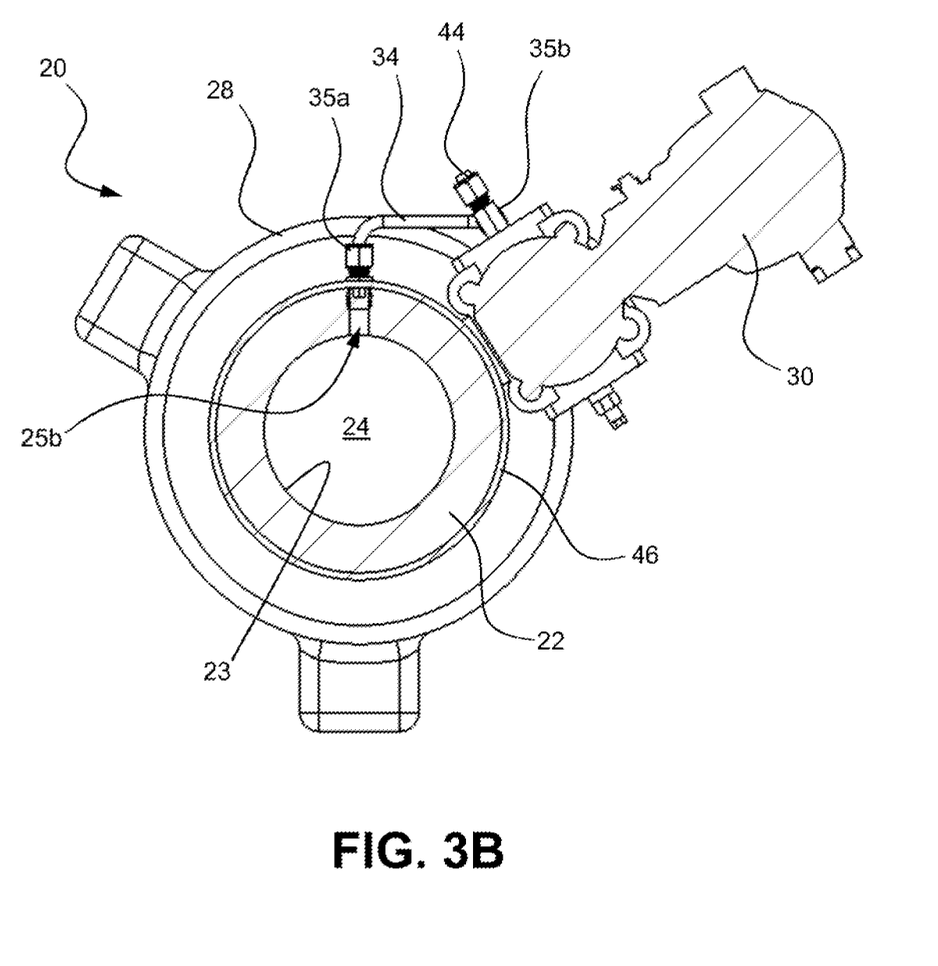
FIG. 3B is a lateral cross-sectional view of the rheology device of FIG. 3A, taken along a midline thereof.
Figure 3C:
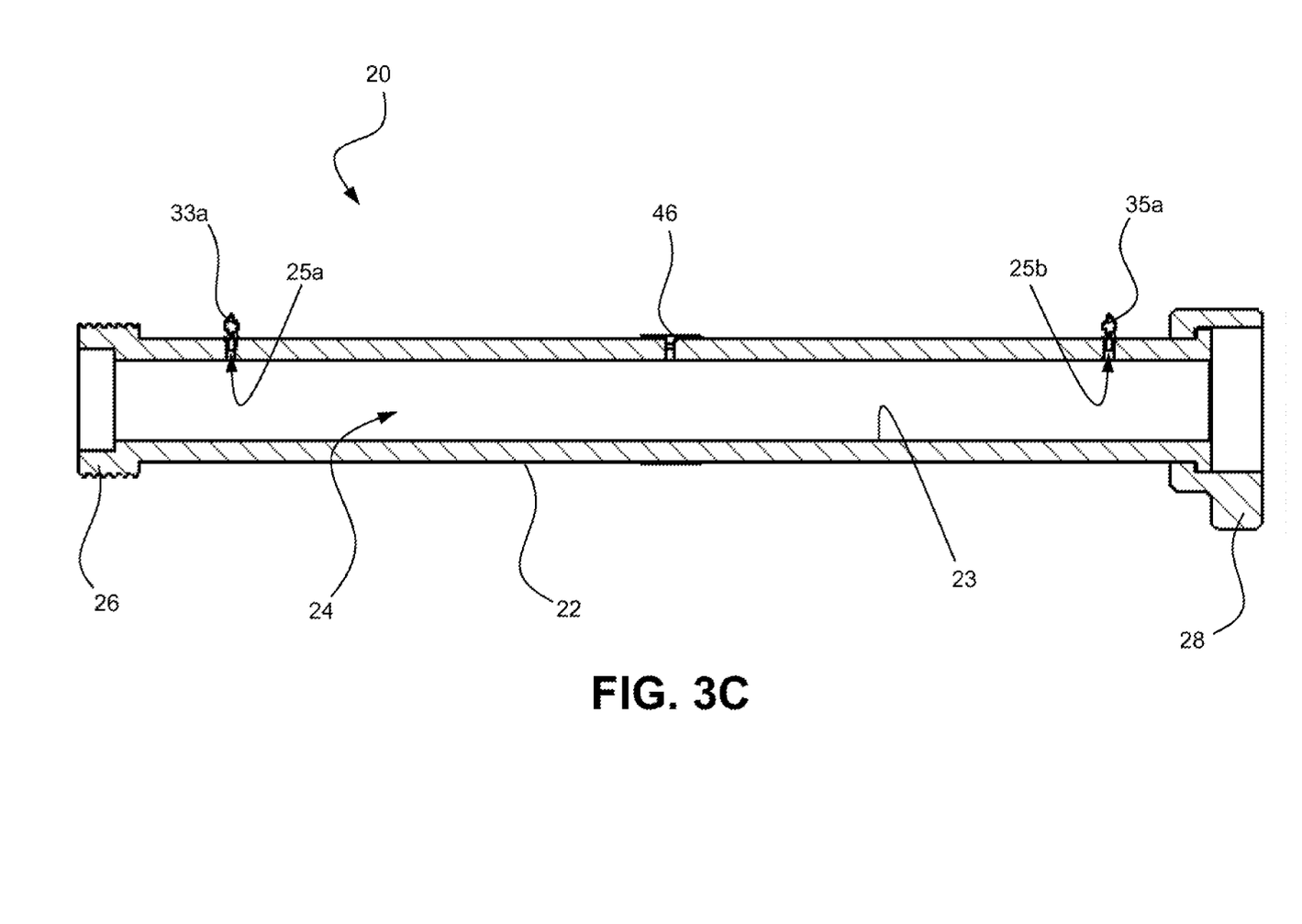
FIG. 3C is an axial cross-sectional view of the rheology device of FIG. 3A, taken along a central longitudinal axis thereof.

To address the abovementioned issues associated with the rotary viscometer, a rheology device and methods are described herein for facilitating fluid rheology modeling. FIG. 3 shows a rheology device 20 according to embodiments of the present disclosure. The device 20 comprises an elongated body 22 having a wall with an inner surface 23 defining an axial inner bore 24 that extends from a first end 26 to a second end 28 of the body 22. In some embodiments, the inner bore 24 has a substantially consistent diameter along the length of the body 22. The first and second ends 26,28 are configured for connection to a fluid line (not shown) such that the device 20 can be connected to the fluid line via a flange connection, a threaded connection, a welded connection, a union connection, or any other suitable connection known to those skilled in the art.

In the illustrated embodiment, the device 20 comprises a differential pressure sensor 30 for measuring a pressure change (ΔP) of a fluid flowing through the inner bore 24. The device 20 comprises a first pressure line 32 and a second pressure line 34. The first pressure line 32 has a first end 33a connected to the body 22 at or near the first end 26, and a second end 33b connected to the differential pressure sensor 30. The second pressure line 34 has a first end 35a connected to the body 22 at or near the second end 28, and a second end 35b connected to the differential pressure sensor 30. Each of the first and second pressure lines 32,34 has an inner fluid passageway extending between the respective first ends 33a,35a and second ends 33b,35b. In some embodiments, the first ends 33a,35a of the first and second pressure lines 32,34 are in direct fluid communication with the inner bore 24 via openings 25a and 25b, respectively, in the wall of the body 22.

In some embodiments, the device 20 comprises a first fitting 42 coupled to and in fluid communication with the first pressure line 32 and a second fitting 44 coupled to and in fluid communication with the second pressure line 34. In the illustrated embodiment, the first and second fittings 42,44 are positioned at or near the second ends 33b,35b of the pressure lines 32,34, respectively. The fittings 42,44 are configured to allow a fluid to be injected into the pressure lines 32,34, respectively.

In some embodiments, the differential pressure sensor 30 is supported on the outer surface of body 22. In some embodiments, the differential pressure sensor 30 is securely coupled to the body 22 by a clamp 46 that is supported on the outer surface of body 22. In further embodiments, the clamp 46 is configured to dampen any vibration of the body 22 to help minimize the transfer of vibration energy to the differential pressure sensor 30 which may affect the accuracy of the differential pressure sensor's 30 readings. The dampening of vibrations by the clamp 46 may also help prevent damage to the differential pressure sensor 30 during transportation of the device 20.

To operate, the rheology device 20 is connected to a fluid line at the first and second ends 26,28 such that the inner bore 24 forms part of the flow path of the fluid flowing through the flow line. The fluid in the flow line flows through the inner bore 24 either from the first end 26 to the second end 28 or from the second end 28 to the first end 26. In some embodiments, the first end 26 is upstream from the second end 28 and the second end 28 is downstream from the first end 26, or vice versa, depending on the flow direction of the fluid in inner bore 24. In some embodiments, the first end 33a of the first pressure line 32 is in communication with an upstream location of the inner bore 24 and the first end 35a of the second pressure line 34 is in communication with a downstream location of the inner bore 24, or vice versa, depending on the direction of fluid flow in inner bore 24.

A spacer fluid is injected into the first and second pressure lines 32,34 via the first and second fittings 42,44. In some embodiments, the spacer fluid is a viscous fluid, such as oil. In some embodiments, the spacer fluid is selected to have a viscosity between about 500 cP and about 2500 cP. The injection of the spacer fluid into the pressure lines 32,34 removes air and any solid particles from the pressure lines 32,24 to prepare the device 20 for operation. In some embodiments, the removal of air from the pressure lines 32,34 by injecting the spacer fluid results in a substantially incompressible hydraulic interface between the spacer fluid in the pressure lines and the fluid flowing through the inner bore 24. In some embodiments, the spacer fluid may prevent solid particles, that may affect the operation of the sensor 30, from entering the pressure lines 32,34, from inner bore 24. In some embodiments, after operation, the pressure lines 32,34 can be flushed out to remove any solid particles by injecting fluid at the fittings 42,44.

The orientation of the differential pressure sensor 30 and/or pressure lines 32,34 can be varied depending on the density of the spacer fluid in pressure lines 32,34 relative to the density of fluids flowing through the inner bore 24 to help minimize fluid exchange between the spacer fluid and the fluid in inner bore 24. For example, where the spacer fluid has a lower density than the density of the fluid inside inner bore 24, the differential pressure sensor 30 and/or pressure lines 32,34 may be positioned above and/or anywhere on the upper half of the body 22. In another example, where the spacer fluid has higher density than the density of the fluid inside inner bore 24, the differential pressure sensor 30 and/or pressure lines 32,34 may be positioned below and/or anywhere on the lower half of the body 22, to help retain the spacer fluid in the pressure lines 32,34.

In alternative embodiments, each of the first ends 33a,35a of the first and second pressure lines 32,34 or the openings 25a,25b in the wall of body 22 may comprise a flexible fluid-impermeable membrane to restrict fluid communication between the first and second pressure lines and the inner bore 24 of device 20, while maintaining pressure communication between the first and second pressure lines and the inner bore 24. In such embodiments, the spacer fluid in pressure lines 32,34 is separated from any fluid in the inner bore 24 by the membrane and the membrane prevents solid particles from entering the pressure lines 32,34, without changing the effect the fluid in inner bore 24 has on the spacer fluid in pressure lines 32,34.

In another sample embodiment, the body 22 may be a component of another apparatus. For example, the fluid flow path defined in body 22 may be (part of) the flow line through a flowmeter, such that the first ends 33a,35a of the first and second pressure lines 32,34 are in communication with an inlet (or an upstream location) and outlet (or a downstream location), respectively, of the flowmeter, or vice versa.

In yet another sample embodiment, in place of the differential pressure sensor 30, two separate pressure sensors can be used, where one pressure sensor is for measuring the fluid pressure in inner bore 24 at or near the first end 26 or the fluid pressure in pressure line 32, and the other pressure sensor is for measuring the fluid pressure in inner bore 24 at or near the second end 28 or the fluid pressure in pressure line 34. In this sample embodiment, the differential pressure ΔP is the difference between the pressures measured by the two pressure sensors. In embodiments where the two pressure sensors are used instead of the differential pressure sensor 30, the pressure lines 32,34 may be omitted, and the two pressure sensors may be placed directly in the fluid flow path defined in body 22, with one pressure sensor positioned at an upstream location of the fluid flow path and the other pressure sensor positioned at a downstream location of the fluid flow path.

In operation, the difference in pressure (ΔP) between the first end 33a of the first pressure line 32 and the first end 35a of the second pressure line 34 is measured by the differential pressure sensor 30 as fluid flows through inner bore 24. In some embodiments, the incompressible hydraulic interface allows the sensor 30 to acquire differential pressure ΔP readings rapidly while minimizing any error associated with fluid flow inside the pressure lines 32,34. The flow rate of the fluid in the flow line, and thus the inner bore 24, is varied and ΔP is measured by the differential pressure sensor 30 at the different flow rates. Based on the multiple flow rates and the corresponding ΔP measurements, the rheology model of the fluid can be determined.

For example, for the Herschel-Bulkley model, at least three flow rates and corresponding ΔP measurements are used to calculate the yield point YP, consistency factor K, and power factor n. To determine the Herschel-Bulkley model, the at least corresponding ΔP measurements can be collected regardless of the flow regime (i.e., laminar, turbulent, or transient flow) of the fluid in inner bore 24.

In a further example, the following equations taught by Chilton and Stainsby (Chilton, R. A., and Stainsby, R. (1998). "Pressure Loss Equations for Laminar and Turbulent Non-Newtonian Pipe Flow." *Journal of Hydraulic Engineering*, vol. 124, 5, 552-529.) reflect the relationship between pressure change ΔP (i.e., pressure drop) and flow rate in a laminar flow regime:

$$\frac{\Delta P}{L} = \frac{4K}{D}\left(\frac{48V}{D}\right)^n\left(\frac{3n+1}{4n}\right)^n\frac{1}{1-X}\left(\frac{1}{1-aX-bX^2-cX^3}\right)^n \quad (7)$$

$$X = \frac{4L(YP)}{D\Delta P} \quad (8)$$

$$a = \frac{1}{2n+1} \quad (9)$$

$$b = \frac{2n}{(n+1)(2n+1)} \quad (10)$$

$$c = \frac{2n^2}{(n+1)(2n+1)} \quad (11)$$

where L is the distance between the first ends of the pressure lines 32,34, D is the diameter of the inner bore 24, V is the velocity of the fluid in inner bore 24. V is the ratio of the flow rate Q of the fluid in inner bore 24 and the cross-sectional area A of the inner bore (i.e., A=n(D/2)²). Based on a minimum of three different flow rates and ΔP measurements, the consistency factor K, power factor n, and yield point YP can be calculated using Equations (7) to (11) for the laminar flow regime. In some embodiments, using the calculated K, n, and YP, and Equation (3), the fluid rheology model can be determined based on the Herschel-Bulkley model.

For a turbulent flow regime, some information about the shear stress at the inner surface 23 that defines the inner bore 24 is necessary to determine the fluid rheology model. In lieu of shear stress information, an approximation to Equations (7) to (11) can be performed to determine K, n, and YP according to Merlo, A., Maglione, R., & Piatti, C. (1995). "An Innovative Model for Drilling Fluid Hydraulics." *Society of Petroleum Engineers*. doi:10.2118/29259-MS. In some embodiments, the approximation can be performed as follows:

1) The flow rate $Q_j$ of the fluid in inner bore 24 is measured (e.g. by a flowmeter) and the corresponding $\Delta P_j$ is measured by sensor 30 of device 20. The measured flow rate $Q_j$ is used to calculate a measured fluid velocity $V_j^{exp}$. The measured $\Delta P_j$ is denoted by $\Delta P_j^{exp}$.
2) Parameters n, K, and YP are assigned initial values $n_0$, $K_0$, and $YP_0$, which are educated guesses and may be based on previous experiments.
3) The Reynolds number $N_{Re}$ is determined based on the measured flow rate $Q_j$. For example, $N_{Re}$ can be determined by:

$$N_{Re} = \frac{4\rho Q_j}{\pi\mu_e D}c \quad (12)$$

where ρ is the density of the fluid and c and $\mu_e$ are, respectively:

$$c = 1 - \frac{1}{2n+1}\left(\frac{YP}{yP + K\left[\frac{8(3n+1)Q_j}{n\pi D^3}\right]^n}\right) \quad (13)$$

$$\mu_e = \frac{YP + K\left[\left(\frac{3n+1}{nc}\right)\left(\frac{8Q_j}{\pi D^3}\right)\right]^n}{\left(\frac{3n+1}{nc}\right)\left(\frac{8Q_j}{\pi D^3}\right)} \quad (14)$$

4) The type of flow regime (e.g. laminar or turbulent) is determined by first calculating a Reynolds number threshold $N_{ReC}$:

$$N_{Re_C} = \left(\frac{4(3n+1)}{ny}\right)^{\frac{1}{1-z}} \quad (15)$$

where y and z are, respectively:

$$y = \frac{\log(n) + 3.93}{50} \quad (16)$$

$$z = \frac{1.75 - \log(n)}{7} \quad (17)$$

If $N_{Re}$ is less than $N_{ReC}$, the flow regime is laminar. If $N_{Re}$ is greater than $N_{ReC}$, the flow regime is turbulent.

5) A calculated pressure change $\Delta P_j^{calc}$ between the first ends of the pressure lines 32,34 (or along inner bore 24 between the first end 26 and the second end 28) can be calculated depending on the determined flow regime as follows:

$$\Delta P_j^{calc} = \frac{32\rho L Q_j^2}{\pi^2 D^5} f \qquad (18)$$

where, if the flow regime is laminar, f is:

$$f = \frac{4}{N_{Re}}\left(\frac{3n+1}{n}\right) \qquad (19)$$

where, if the flow regime is turbulent, f is:

$$f = y N_{Re}^{-z} \qquad (20)$$

6) The squared error $e_j$ is determined by:

$$e_j = (\Delta P_j^{exp} - \Delta P_j^{calc})^2 \qquad (21)$$

7) Steps 1) to 5) are repeated for each pair of measured fluid velocity $V_j^{exp}$ and its corresponding measured $\Delta P_j^{exp}$.

8) A summation of the squared errors $e_j$ of multiple pairs of $V_j^{exp}$ and $\Delta P_j^{exp}$ is minimized using:

$$E(n, K, \tau_y) = \sum_{j=1}^{N} e_j \qquad (22)$$

$$n, K, \tau_y = \underset{n,K,\tau_y}{\operatorname{argmin}} E, \qquad (23)$$

subject to: $n, K \in (0, \infty)$ and $\tau_y \in [0, \infty)$ where $\tau_y$ is the yield point (i.e., YP) and N is the number of pairs of $V_j^{exp}$ and $\Delta P_j^{exp}$, which is equal to or greater than 3, to determine the optimal values of n, K, and YP (i.e., $\tau_y$).

9) The optimal values of n, K, and YP are used in the Herschel-Bulkley fluid model (Equation (3)) to determine a fluid rheology model, which can be used in fluid hydraulic calculations.

Figure 5A:
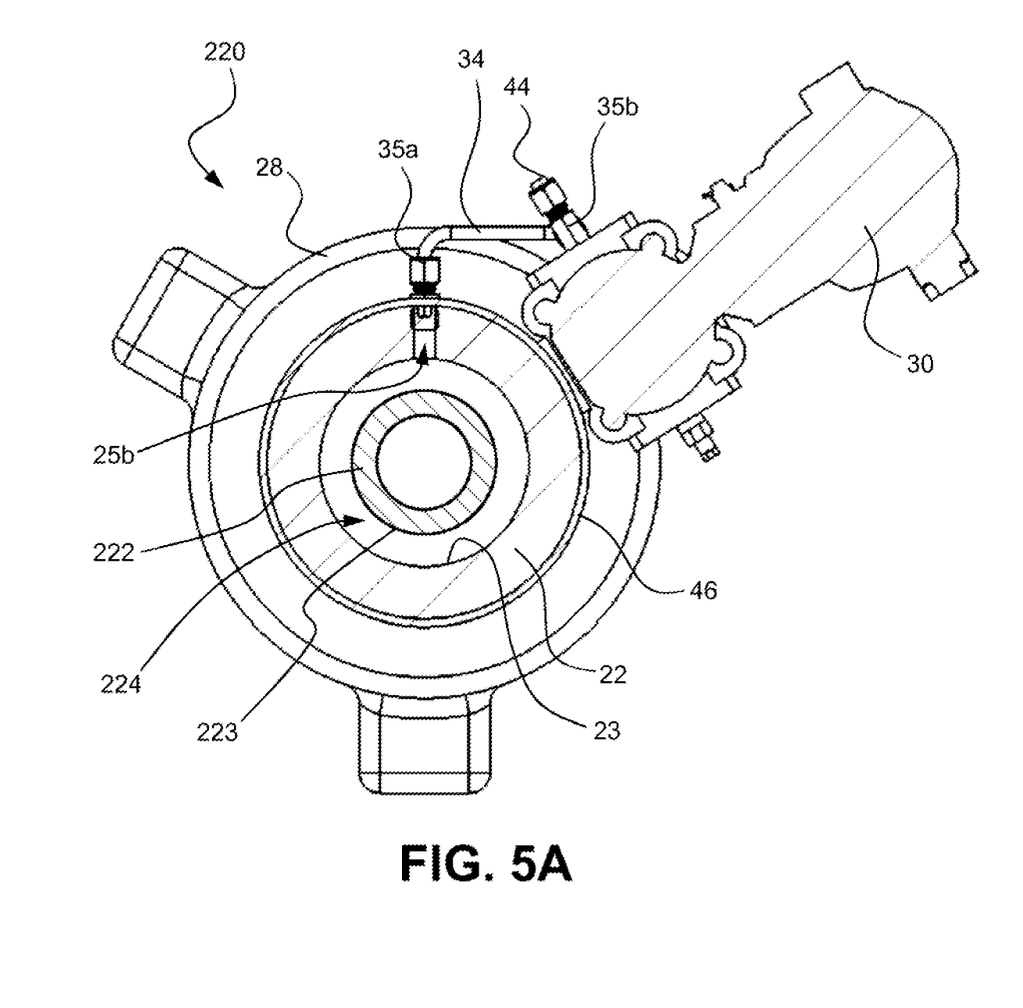
FIG. 5A is a lateral cross-sectional view of a rheology device according to another embodiment of the present disclosure, the rheology device comprising an inner tubular.
Figure 5B:
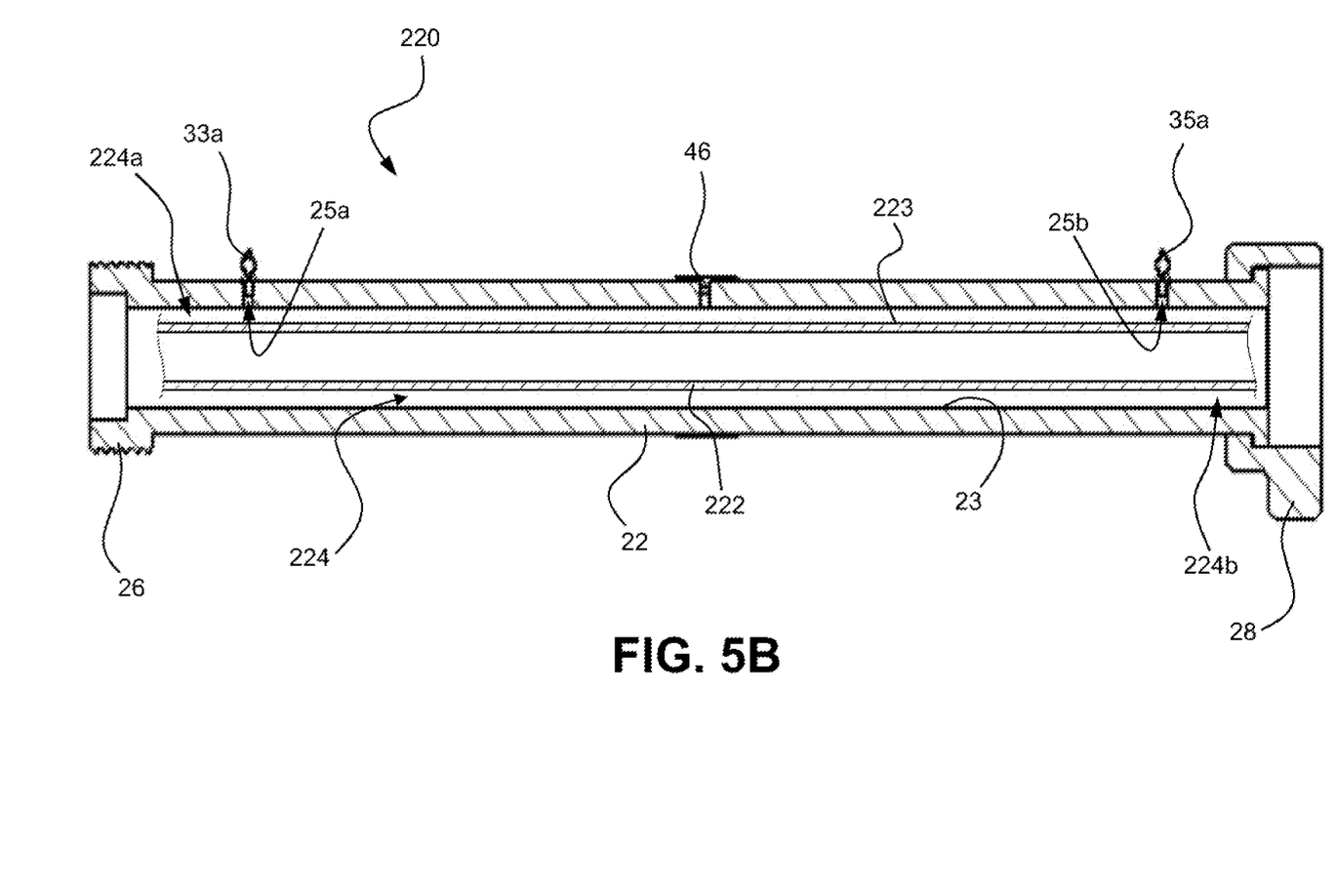
FIG. 5B is an axial cross-sectional view of the rheology device of FIG. 5A, taken along a central longitudinal axis thereof.

A skilled person can appreciate that other configurations of the rheology device are possible. For example, FIG. 5 shows a rheology device 220 that is similar to rheology device 20 described above except rheology device 220 comprises an inner tubular 222 that extends axially inside the inner bore of the body 22. Inner tubular 222 is substantially concentrically positioned inside the body 22. The outer diameter of the inner tubular 222 is smaller than the inner diameter of the body 22 such that an annulus 224 is defined between the inner surface 23 of the body 22 and the outer surface 223 of the inner tubular 222. The annulus 224 provides an axially extending annular fluid flow path. The rheology device 220 therefore has an annular fluid flow path rather than the inner bore flow path 24 of rheology device 20. In the sample embodiment shown in FIG. 5, the first ends 33a,35a of the first and second pressure lines 32,34 are in communication with a first end 224a and a second end 224b, respectively, of the annulus 224. The inner tubular 222 may be referred to as the small tubular while the body 22 may be referred to as the large tubular.

Figure 4:
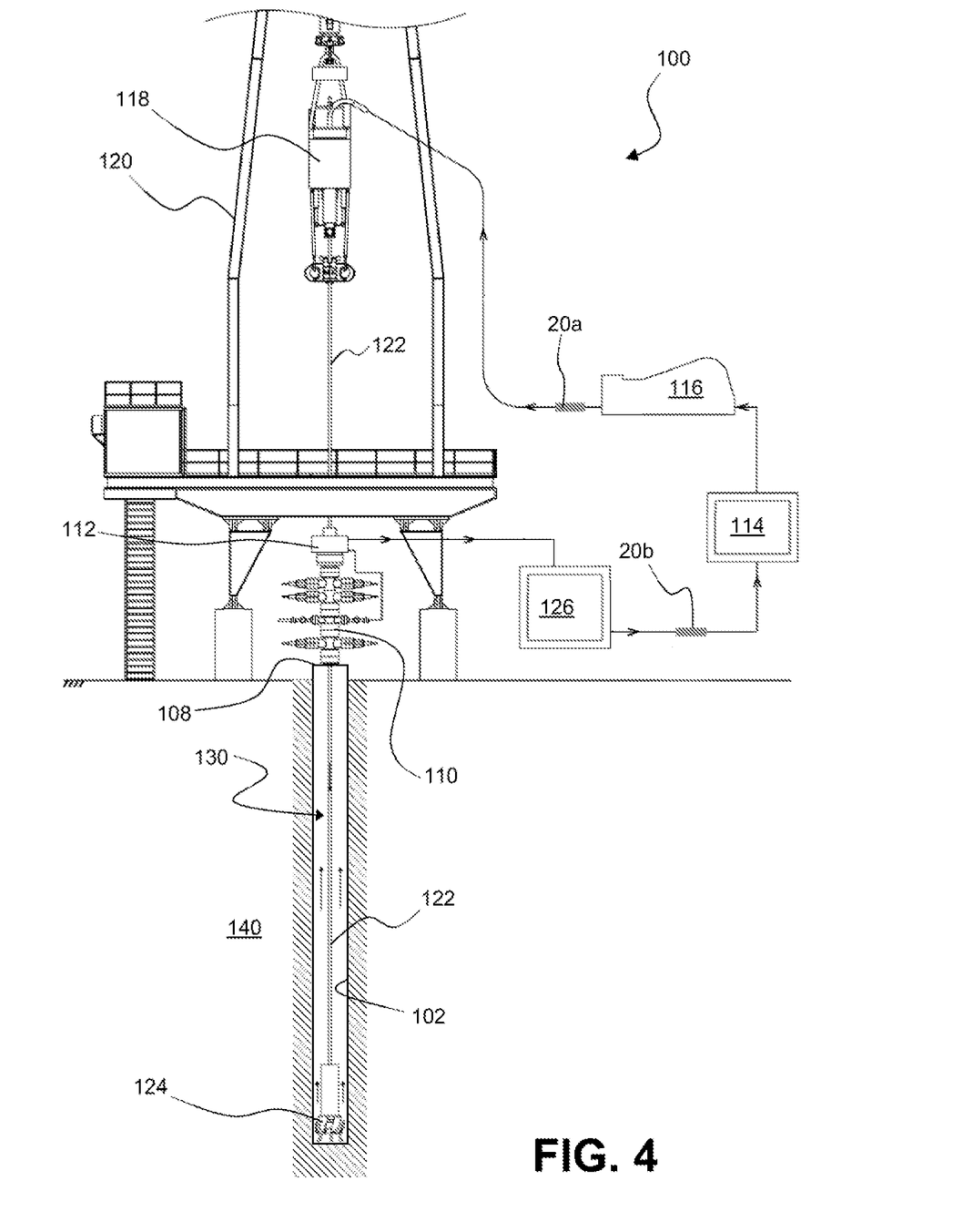
FIG. 4 is a schematic drawing of a drilling system having one or more rheology devices, according to one embodiment.

FIG. 4 shows a sample drilling system 100 where the above-described rheology devices can be used. In some embodiments, drilling system 100 operates to drill and extend a wellbore 102 to penetrate one or more subterranean formations 140 for the purpose of, for example, oil and gas exploration and production operations. The drilling system 100 comprises a blowout preventer (BOP) stack 110, a rotating control device (RCD) 112, mud handling equipment 114, a rig pump 116, a top drive 118 supported on a drilling rig 120, a drill string 122, which comprises one or more light weight and/or heavy weight drill pipes, and a BHA comprising one or more drill pipes, a drill collar, and a drilling tool 124, such as a drill bit. Optionally, the drilling system 100 comprises a managed pressure drilling manifold 126 for maintaining a desired backpressure within the wellbore 102.

The BOP stack 110 is operably coupled to the surface opening 108 of the wellbore 102 by methods known to the those skilled in the art to prevent blowout, i.e., the uncontrolled release of formation fluids and/or gasses from the wellbore 102 during drilling operations. The RCD 112 is operably coupled to the BOP stack 110 and forms a friction seal around the drill string 122. The drilling tool 124 is operably coupled to the drill string 122 and extends within the wellbore 102. The drill string 122 extends into the wellbore 102 through the BOP stack 110.

The mud handling equipment 114 may include variety of apparatus, such as, for example, a degasser, a desander, cyclones, shakers, mud tanks, etc. A person skilled in the art can appreciate that the specific apparatus to be used in equipment 114 may vary depending on drilling needs. In the drilling system 100, the mud handling equipment 114 is operably coupled to, and in fluid communication with, the RCD 112. The MPD manifold 126, if included, is operably coupled to, and in fluid communication with, the RCD 112 and the mud handling equipment 114, such that fluid flows through the MPD manifold 126 prior to reaching the equipment 114.

The mud handling equipment 114 is operably coupled to, and in fluid communication with, the rig pump 116. The rig pump 116 is operably coupled to, and in fluid communication with, the top drive 118. The top drive 118 is operably coupled to the drill string 122 and the top drive 118 is configured to control the drill string 122.

One or more components of the drilling system 100 may be operably coupled to and in communication with one or more workstations (not shown) via wired or wireless connectivity.

In operation, the drilling system 100 is used to extend the reach or penetration of the wellbore 102 into the one or more subterranean formations. To this end, the drill string 122 is rotated by the top drive 118, and weight-on-bit is applied to the drilling tool 124, thereby causing the drilling tool 124 to rotate against the bottom of the wellbore 102. At the same time, the rig pump 116 circulates drilling fluid to the drilling tool 124, via the drill string 122. The drilling fluid is discharged from the drilling tool 124 into the wellbore 102 to clear away drill cuttings from the drilling tool. The drill cuttings are carried back to the surface by the drilling fluid via wellbore annulus 130 of the wellbore 102 surrounding the drill string 122. The drilling fluid and the drill cuttings, in combination, are also referred to herein as "drilling mud."

The drilling mud flows up the wellbore annulus 130 and into the RCD 112 through the BOP stack 110. The RCD 112 sends the flow of the drilling mud to the mud handling equipment 114, optionally via MPD manifold 126 while preventing communication between the wellbore annulus 130 and the atmosphere. The drilling mud received by the mud handling equipment 114 is processed by the mud handling equipment 114 to capture and separate gas from the drilling mud and remove the drill cuttings from drilling mud. The resulting drilling fluid exiting the mud handling equipment 114 is recirculated by the rig pump 116 to the drilling tool 124, via the drill string 122.

In some embodiments, the drilling system 100 comprises a first rheology device 20a and/or a second rheology device 20b. The first and second rheology device 20a,20b may each be similar to or the same as the rheology device 20 described above with respect to FIG. 3. For simplicity, the description below assumes that the first and second rheology devices 20a,20b each have the same components and configuration as rheology device 20.

In the illustrated embodiment, the first rheology device 20a is positioned between and in fluid communication with the rig pump 116 and the top drive 118, for example at or near the outlet of the rig pump 116. In some embodiments, the first rheology device 20a is fluidly connected to the fluid flow line that connects the rig pump 116 to the top drive 118, such that at least some drilling fluid from the rig pump 116 flows through the inner bore 24 of the first rheology device 20a. In alternative embodiments, the first rheology device 20a can be positioned between and in fluid communication with the mud handling equipment 114 and the rig pump 116, for example at or near the inlet of the rig pump 116. In the alternative embodiments, the first rheology device 20a is fluidly connected to the fluid flow line that connects the mud handling equipment 114 to the rig pump 116, such that at least some drilling fluid from the mud handling equipment 114 flows through the inner bore 24 of the first rheology device 20a. The first rheology device 20a is configured to help determine the rheology model of the clean drilling fluid going into or coming out of the rig pump 116. Based on the rheology model of the clean drilling fluid, a hydraulic model of the flow of the drilling fluid through the drill string 122 and the drilling tool 124 can be generated.

In the illustrated embodiment, the second rheology device 20b is positioned between and in fluid communication with the RCD 112 (or the MPD manifold 126, if included) and the mud handling equipment 114. In some embodiments, the second rheology device 20b is fluidly connected to the fluid flow line that connects the RCD 112 (or the MPD manifold 126, if included) to the mud handling equipment 114, such that at least some drilling mud (and/or wellbore fluid) returning to surface from annulus 130 flows through the inner bore 24 of the second rheology device 20b. The second rheology device 20b is configured to help determine the rheology model of the drilling mud (and/or wellbore fluid) from annulus 130. Such drilling mud and/or wellbore fluid may be at a temperature that is close to the average temperature in the annulus 130. Based on the rheology model of the drilling mud, a hydraulic model of the flow of drilling mud in the wellbore annulus 130 can be generated. Such a hydraulic model may be more accurate because the underlying rheology model is based on measurements taken from drilling mud that more closely resembles the composition and temperature of the actual drilling mud in the wellbore annulus 130.

In operation, the rheology devices 20a,20b are (wiredly and/or wirelessly) coupled to and in communication with a workstation (not shown). As fluid flows through the respective inner bore 24, each of the rheology devices 20a,20b measures ΔP of the fluid flow between the first ends of the respective pressure lines 32,34, as described above with respect to device 20 and FIG. 3. The flow rate of the drilling fluid entering the first rheology device 20a ("upstream flow rate") may be obtained from the rig pump 116. The upstream flow rate and the corresponding ΔP measured in real-time by the first rheology device 20a are transmitted to the workstation for rheology modeling of the clean drilling fluid. The flow rate of the drilling mud entering the second rheology device 20b ("downstream flow rate") may be measured by a flowmeter (not shown) positioned in the flow line upstream or downstream of the second rheology device 20b. In one embodiment, the flow path of the rheology device 20b is the flow line of the flowmeter itself, such that the rheology device 20b is configured to measure the differential pressure ΔP between the inlet (or an upstream location) and outlet (or a downstream location) of the flowmeter. For example, the first ends 33a,35a of the first and second pressure lines 32,34 of device 20b may be in communication with the inlet and outlet, respectively, of the flowmeter, or vice versa. In another example, a first pressure sensor is placed at the inlet of the flowmeter and a second pressure sensor is placed at the outlet of the flowmeter, and the pressure readings of the first and second pressure sensors are compared to obtain ΔP. The downstream flow rate and the corresponding ΔP measured in real-time by the second rheology device 20b are transmitted to the workstation for rheology modeling of the drilling mud.

In some embodiments, the workstation may comprise a processor, a memory, and/or a human-machine interface (HMI). In some embodiments, the workstation comprises a processor-based device, such as a computing device that includes, but is not limited to: a desktop computer, laptop or notebook computer, tablet computer, mainframe computer system, handheld computer, network computer, or other computing devices with like capability. In some embodiments, the HMI comprises any type of user interface, including, for example: a graphical user interface, a command line user interface, and/or a hardware user interface. The HMI may comprise interface controls (e.g., hardware interface buttons and/or software interface buttons) that are used to navigate control menus, functions, information, and user input. The HMI may include one or more displays configured to display the control menus, functions, and information that are navigated using the HMI. The memory may contain modules that are executable by the processor and data. For example, the memory may be random access memory (RAM), read only memory (ROM), flash memory, a solid state drive, memory card, a hard drive, optical disk, floppy disk, magnetic tape, or any other memory components. A data store may also be located in the memory for storing data along with an operating system that is executable by the processor. The term "data store" may refer to any device or combination of devices capable of storing, accessing, organizing and/or retrieving data. Storage system components of a data store may include storage systems such as a SAN (Storage Area Network), cloud storage network, volatile or non-volatile RAM, optical media, or hard-drive type media.

As drilling of wellbore 102 progresses, drill pipe segments are periodically added to the drill string 122 to allow the drill string 122 to extend further into the wellbore 102. To add a drill pipe segment to the drill string 122, the rig pump 116 is turned off or the pump rate of the rig pump 116 is reduced. After the drill pipe segment is connected the drill string 122, the rig pump 116 is turned back on or the pump rate of the rig pump 116 is increased to resume regular operation of the rig pump. The periodic sequential decrease and increase in the pump rate of the rig pump cause the flow rate of the drilling fluid and drilling mud in system 100 to periodically change as well. The rheology device 20a,20b can take advantage of these periodic changes in flow rate in system 100 and measure corresponding ΔP at different flow rates.

With a minimum of three pairs of different measured flow rate Q and corresponding ΔP measurement, the workstation operates to determine the rheology model of the drilling fluid and the drilling mud using, for example, the Chilton and Stainsby equations (i.e., Equations (7) to (11)), the Herschel-Bulkley model (i.e., Equation (3)), and where necessary, the approximation, as described above. In some embodiments, one or both of the rheology devices 20a,20b operate continuously (or at least periodically) to provide real-time ΔP measurements to the workstation and the workstation continuously (or at least periodically) updates the rheology models using the new real-time data. In some embodiments, prior to generating the rheology models, a mathematical filter may be applied to the flow rate and/or ΔP data to reduce noise and/or error that may be caused by, for example, cavitation or intermittent turbulence in the flow lines.

Based on the rheology models, the rheology of the drilling fluid and/or drilling mud can be monitored continuously (or frequently) to detect changes that may be caused by for example the invasion of kick fluid and/or degradation of chemicals in the drilling fluid, and the composition of the drilling fluid can be adjusted accordingly as necessary. From the rheology models, hydraulic models of various parts of the drilling system 100 can be calculated and updated as the rheology models are updated. These hydraulic models may be useful in drilling hydraulic optimization, MPD, and/or wellbore pressure profiling, as the substantially constant monitoring of the drilling fluid and/or drilling mud rheology allows an operator to adjust the drilling fluid and/or drilling mud composition to achieve the desired objectives.

In some embodiments, to calculate frictional pressure drops in system 100, the wellbore 102 is divided into two or more wellbore sections according to changes in drill string diameter and/or wellbore inner diameter. For example, the drill pipe of the BHA is positioned in a first axial portion of the wellbore and the drill collar is positioned in a second axial portion of the wellbore. If the first axial portion has a substantially consistent inner diameter (the "first diameter") and the second axial portion has a substantially consistent inner diameter (the "second diameter"), then the first axial portion is defined as the first wellbore section and the second axial portion is defined as the second wellbore section. In some embodiments, the first and second diameters are substantially the same.

In another example, the second axial portion has two different inner diameters (i.e., the second diameter and a third diameter) along its length (e.g. the second axial portion extends between a cased portion and an uncased portion of the wellbore), then the second axial portion with the second diameter is defined as the second wellbore section and the second axial portion with the third diameter is defined as the third wellbore section. The wellbore can thus be divided into multiple wellbore sections depending on the position of the various components of the drill string 122 and the inner diameter of the corresponding axial portions of the wellbore 102.

After the wellbore 102 is divided into wellbore sections, the fluid velocity V is calculated (i.e., V=Q/A) for each wellbore section. Based on the fluid velocity V and the rheology model determined as described above, the Reynolds number R can be determined for each wellbore section according to the following:

$$R = \frac{4n\rho VD(1 - aX - bX^2 - cX^3)}{\mu_w(3n + 1)} \quad (24)$$

-continued
$$\mu_w = \left[\frac{D\Delta P}{4L}\right]^{\frac{n-1}{n}} \left[\frac{K}{1 - X}\right]^{\frac{1}{n}} \quad (25)$$

The Reynolds number R is used to determine the flow regime for each wellbore section. Based on the flow regime and the Reynolds number R, the frictional pressure drops in each wellbore section can then be calculated by methods known to those skilled in the art.

In some embodiments, the rheology models determined as described above using devices 20a,20b can be used to compare the rheology of the clean drilling fluid entering the wellbore 102 with the rheology of the drilling mud exiting the wellbore annulus 130. The comparison may be useful in detecting inflow of formation fluid and/or contamination of the drilling fluid by destructive materials such as salts, minerals, etc., and the drilling fluid can be treated accordingly to help prevent problems with the drilling operation.

In some embodiments, the ability to determine drilling fluid and/or mud rheology in real-time may provide more accurate hydraulic models, on which calculations of the pressure profile inside the wellbore 102 are based.

In some embodiments, the effect of temperature on drilling fluid rheology is automatically accounted for since the drilling mud flow through device 20b is at substantially the same temperature as the drilling mud in wellbore annulus 130.

In some embodiments, the above-described methods of obtaining fluid rheology models allows the error associated with such models to be cancelled or at least minimized. For example, when using the Herschel-Bulkley model to determine frictional pressure drops in the drill string 122 and wellbore annulus 130, the same model is used to reverse calculate the Hershcel-Bulkley parameters (i.e., K, n, and YP) based on the relationship between flow rate Q and ΔP measured by the rheology device. As a result, the Hershcel-Bulkley parameters are automatically calibrated for the flow lines upstream (i.e., clean drilling fluid) and downstream (i.e., drilling mud) of the wellbore 102. Since the conversion from a pipe flow model (e.g. flow model of inner bore 24) to an annulus flow model (e.g. flow model of wellbore annulus 130) involves a mathematical operation, the error associated with the simulation of annular flow (in the wellbore annulus 130) based on a pipe flow model (downstream of the wellbore 102) may be close to zero or negligible. In some embodiments, instead of having inner bore 24 as the fluid flow path through the second rheology device 20b (downstream of the wellbore 102), the second rheology device 20b may be configured to be the same as or similar to the rheology device 220 described above with respect to FIG. 5 such that the second rheology device 20b has an annular fluid flow path 224 defined between a small tubular and a large tubular. The annular fluid flow path in the second rheology device 20b may allow a simpler calculation of the rheology model of the drilling mud exiting the wellbore 102 via annulus 130.

In some embodiments, it is possible to use only one of the rheology devices 20a,20b to obtain hydraulic models for both the clean drilling fluid and the drilling mud. However, while a single rheology device can provide sufficient measurements for the hydraulic models, the resulting hydraulic models may have greater error.

The present disclosure provides a step towards achieving full automation of drilling fluid property monitoring and maintenance with a device and methods that require minimal operator interaction and minimal change to existing surface equipment, while more accurately representing the downhole pressure and temperature environment. Given the importance of accurate rheology characterization, the present technology may be particularly useful in drilling operations that rely heavily on accurate hydraulics modeling, such as active annular pressure management using MPD and dual gradient drilling (DGD) techniques.

While the present technology is generally described with respect to drilling operations, it can be appreciated the above-described device and methods can be used in any industrial application where fluid rheology determination is desired. For example, the present technology may be adapted and applied to various processes in the food industry and the polymer industry where it is desirable to obtain rheology models of fluids flowing through flow lines.

Unless the context clearly requires otherwise, throughout the description and the "comprise", "comprising", and the like are to be construed in an inclusive sense, as opposed to an exclusive or exhaustive sense; that is to say, in the sense of "including, but not limited to"; "connected", "coupled", or any variant thereof, means any connection or coupling, either direct or indirect, between two or more elements; the coupling or connection between the elements can be physical, logical, or a combination thereof; "herein", "above", "below", and words of similar import, when used to describe this specification, shall refer to this specification as a whole, and not to any particular portions of this specification; "or", in reference to a list of two or more items, covers all of the following interpretations of the word: any of the items in the list, all of the items in the list, and any combination of the items in the list; the singular forms "a", "an", and "the" also include the meaning of any appropriate plural forms.

Where a component is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims. All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples but should be given the broadest interpretation consistent with the description as a whole.

What is claimed is:

1. A rheology device for connection to a fluid flow line having a fluid flowing therethrough, the rheology device comprising:
    an elongated body having a first end, a second end, and a fluid flow path defined in the elongated body, the fluid flow path extending between the first and second ends, the first and second ends configured for connection to the fluid flow line to allow fluid communication between the fluid flow line and the fluid flow path;
    a differential pressure sensor;
    a first pressure line having a first end, a second end, and an inner fluid passageway extending between the first and second ends, the first end coupled to the elongated body and in communication with the fluid flow path at or near the first end of the elongated body, and the second end coupled to and in communication with the differential pressure sensor; and
    a second pressure line having a first end, a second end, and an inner fluid passageway extending between the first and second ends, the first end coupled to the elongated body and in communication with the fluid flow path at or near the second end of the elongated body, and the second end coupled to and in communication with the differential pressure sensor,
    the differential pressure sensor for measuring at least three differences in pressure between the first and second pressure lines, each of the at least three differences in pressure corresponding to a different flow rate of the fluid, and the at least three differences in pressure and the corresponding different flow rates are used to determine a rheology model of the fluid;
    a first fitting coupled to and in fluid communication with the first pressure line; and
    a second fitting coupled to and in fluid communication with the second pressure line, the first and second fittings configured to allow a spacer fluid to be injected into the inner fluid passageways of the first and second pressure lines, respectively.

2. The rheology device of claim 1, wherein the spacer fluid has a viscosity between about 500 cP and about 2500 cP.

3. The rheology device of claim 1, wherein the differential pressure sensor is supported on an outer surface of the elongated by a clamp configured to dampen vibration.

4. The rheology device of claim 1, wherein the fluid flow path is an inner bore of the elongated body.

5. The rheology device of claim 1, wherein the fluid flow path is an annular space of the elongated body.

6. A method for determining a rheology model for a fluid flowing in a fluid flow line, the method comprising:
    a) using a sensor to measure a flow rate of the fluid in the fluid flow line;
    b) determining a corresponding difference in pressure of the fluid between an upstream location and a downstream location of a fluid flow path, the fluid flow path being in fluid communication with the fluid flow line such that at least some of the fluid flows through the fluid flow path from the upstream location to the downstream location;
    c) changing the flow rate of the fluid;
    d) repeating steps a) to c) at least three times to provide at least three data pairs, each data pair having a respective flow rate and a respective difference in pressure;
    e) calculating, based on the at least three data pairs, a yield point, a consistency factor, and a power factor; and f) determining, based on the yield point, the consistency factor, and the power factor, a rheology model of the fluid; and wherein the yield point (YP), the consistency factor (K), and the power factor (n) are calculated by:

$$\frac{\Delta P}{L} = \frac{4K}{D}\left(\frac{8V}{D}\right)^n \left(\frac{3n+1}{4N}\right)^n \frac{1}{1-X}\left(\frac{1}{1-aX-bX^2-cX^3}\right)^n$$

$$X = \frac{4L(YP)}{D\Delta P}$$

$$a = \frac{1}{2n+1}$$

$$b = \frac{2n}{(n+1)(2n+1)}$$

$$c = \frac{2n^2}{(n+1)(2n+1)}$$

where, for each data pair, $\Delta P$ is the respective difference in pressure, L is a distance between the upstream location and the downstream location, D is a diameter of the fluid flow path, V is a velocity of the fluid which is the ratio between the respective flow rate and the cross-sectional area of the fluid flow path.

7. The method of claim 6 wherein determining the corresponding difference in pressure is performed by a rheology device; the fluid flow path is defined in the rheology device; and the rheology device comprises a first pressure line and a second pressure line, and a first end of the first pressure line is in communication with the upstream location, and a first end of the second pressure line is in communication with the downstream location.

8. The method of claim 7 comprising, prior to determining the corresponding difference in pressure, filling the first and second pressure lines with a spacer fluid.

9. The method of claim 7, wherein the rheology device comprises a differential pressure sensor and the corresponding difference in pressure is determined by the differential pressure sensor.

10. The method of claim 6, wherein the sensor is a flowmeter; the fluid flow path is defined in the flowmeter, the upstream location is an inlet of the flowmeter; and the downstream location is an outlet of the flowmeter.

11. The method of claim 6 wherein the rheology model is determined using:

$$\tau = YP + KYn$$

where $\tau$ is shear stress, YP is the yield point, K is the consistency factor, Y is shear rate, and n is the power factor.

12. The method of claim 6 wherein calculating the yield point, the consistency factor, and the power factor comprises an approximation, the approximation comprising:

for each data pair:
assigning an initial value to each of the yield point, the consistency factor, and the power factor;
determining a Reynolds number based on the respective flow rate and the initial values of the yield point, the consistency factor, and the power factor;
determining a flow regime based on the Reynolds number and the initial values of the yield point, the consistency factor, and the power factor;
calculating a calculated difference in pressure based on the flow regime;
calculating a squared error based on the respective difference in pressure and the calculated difference in pressure; and
minimizing a summation of the respective squared errors of the at least three data pairs, wherein the yield point, the consistency factor, and the power factor are calculated based on the summation.

13. The method of claim 12 wherein the Reynolds number $N_{Re}$ for each data pair is:

$$N_{Re} = \frac{4\rho Q_j}{\pi \mu_e D}c$$

where $\rho$ is the density of the fluid, $Q_j$ is the respective flow rate, D is a diameter of the fluid flow path, and c and $\mu_e$ are respectively:

$$c = 1 - \frac{1}{2n+1}\left(\frac{YP}{YP + K\left[\frac{8(3n+1)Q_j}{n\pi D^3}\right]^n}\right)$$

$$\mu_e = \frac{YP + K\left[\left(\frac{3n+1}{nc}\right)\left(\frac{8Q_j}{\pi D^3}\right)\right]^n}{\left(\frac{3n+1}{nc}\right)\left(\frac{8Q_j}{\pi D^3}\right)}$$

where n is the initial value of the power factor, YP is the initial value of the yield point, K is the initial value of the consistency factor.

14. The method of claim 13 wherein, for each data pair, determining a flow regime comprises calculating a Reynolds number threshold $N_{ReC}$:

$$N_{Re_C} = \left(\frac{4(3n+1)}{ny}\right)^{\frac{1}{1-z}}$$

where y and z are, respectively:

$$y = \frac{\log(n) + 3.93}{50}$$

$$z = \frac{1.75 - \log(n)}{7}.$$

15. The method of claim 14 wherein, for each data pair, the calculated difference in pressure $\Delta P_j^{calc}$ is:

$$\Delta P_j^{calc} = \frac{32\rho L Q_j^2}{\pi^2 D^5} f$$

where, if the Reynolds number $N_{Re}$ is less than the Reynolds number threshold $N_{ReC}$, f is:

$$f = \frac{4}{N_{Re}}\left(\frac{3n+1}{n}\right)$$

and where, if the Reynolds number $N_{Re}$ is greater than the Reynolds number threshold $N_{ReC}$, f is:

$$f = y N_{Re}^{-z}.$$

16. The method of claim 15 wherein, for each data pair, the squared error $e_j$ is:

$$e_j = (\Delta P_j^{exp} - \Delta P_j^{calc})^2$$

where $\Delta P_j^{exp}$ is the respective difference in pressure.

17. The method of claim 16 wherein the summation is minimized using:

$$E(n, K, \tau_y) = \sum_{j=1}^{N} e_j$$

$$n, K, \tau_y = \arg\min_{n,K,\tau_y} E,$$

subject to: $n, K \in (0, \infty)$ and $\tau_y \in [0, \infty)$ where $\tau y$ is the yield point and N is the number of data pairs, to calculate the yield point, the consistency factor, and the power factor.

18. The method of claim 6 comprising repeating steps a) to e) and updating the rheology model based on the yield point, the consistency factor, and the power factor to provide an updated rheology model.

19. The method of claim 18 comprising comparing the updated rheology model with the rheology model for monitoring the composition of the fluid.

20. The method of claim 6 comprising generating a hydraulic model based on the rheology model.

21. The method of claim 6 wherein the fluid is a drilling fluid or a drilling mud in a system for drilling a wellbore and wherein for a section of the wellbore, the Reynolds number R is:

$$R = \frac{4n\rho V D(1 - aX - bX^2 - cX^3)}{\mu_w(3n+1)}$$

where $\rho$ is the density of the fluid and $\mu_w$ is:

$$\mu_w = \left[\frac{D\Delta P}{4L}\right]^{\frac{n-1}{n}} \left[\frac{K}{1-X}\right]^{\frac{1}{n}}.$$

* * * * *